United States Patent [19]

Ray

[11] 4,016,537
[45] Apr. 5, 1977

[54] ALARM TRIGGERING CIRCUIT

[76] Inventor: Richard V. Ray, 7249 Petrol St., Los Angeles, Calif. 90723

[22] Filed: June 21, 1976

[21] Appl. No.: 697,996

Related U.S. Application Data

[63] Continuation-in-part of Ser. No. 595,763, July 14, 1975, abandoned.

[52] U.S. Cl. .............................. 340/64; 307/10 AT
[51] Int. Cl.$^2$ ........................................ B60R 25/10
[58] Field of Search ...................... 340/63, 64, 276; 307/10 AT; 180/114

[56] References Cited

UNITED STATES PATENTS

| 3,829,829 | 8/1974 | Teich | 340/64 |
| 3,866,168 | 2/1975 | McGuirk, Jr. | 340/64 |
| 3,930,226 | 12/1975 | Plumberg | 340/64 |
| 3,956,732 | 5/1976 | Teich | 340/64 |

Primary Examiner—Alvin H. Waring
Attorney, Agent, or Firm—W. Edward Johansen

[57] ABSTRACT

The present invention is an alarm triggering circuit for use in an alarm system for a motor vehicle having an alarm, a power source and an ignition system that provides a positive voltage when it is turned on and a ground when it is turned off. The alarm triggering circuit includes an alarm setting circuit which sets the alarm triggering circuit and a delaying circuit which enables an operator of the motor vehicle to exit it. The setting circuit includes a first timer chip whose output is normally positive and a first transistor which when it is turned on provides a ground to the input terminal of the first timer chip. When the ignition system is turned off, the first transistor is turned off thereby causing the output of the first timer chip to go to ground. The delaying circuit includes a capacitor in series with a variable resistor and is electrically coupled to the alarm triggering circuit which includes a second timer chip whose ground terminal is electrically coupled to the output terminal of the first timer chip and a second transistor whose base is electrically coupled to the output terminal of the second transistor and which is electrically coupled to the alarm so that when it is turned on by the output of the second timer chip the alarm will sound.

3 Claims, 1 Drawing Figure

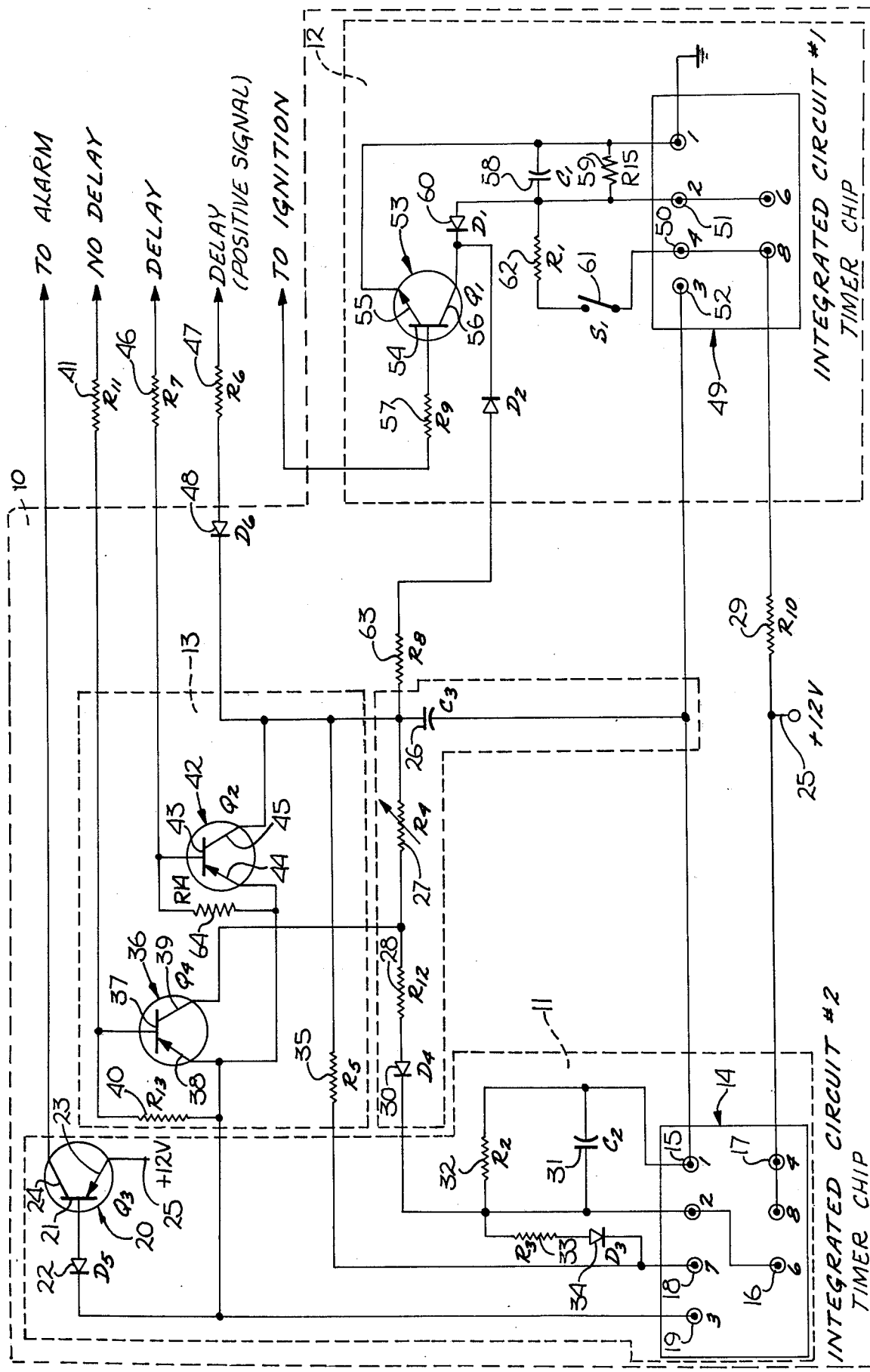

ALARM TRIGGERING CIRCUIT

CROSS-REFERENCE TO RELATED APPLICATION

This application is a continuation-in-part application of an application entitled Automatically Activated Car Alarm, filed July 14, 1975 and having Ser. No. 595,763, now abandoned.

BACKGROUND OF THE INVENTION

1. Field of the Invention

The present invention relates to an electronic alarm system for a motor vehicle, and more particularly to an electronic alarm system that it is fully automatic and ignition operated.

2. Description of the Prior Art

The prior art includes many antitheft circuits which operate by grounding the ignition system of the motor vehicle, severing its fuel supply, or sounding a alarm such as a horn or a siren. Most of these antitheft circuits include control switches that are hidden within the operator's compartment of the motor vehicle so that a would be thief is foiled in his attempt to enter the motor vehicle or having once entered the motor vehicle in his attempt to find the antitheft circuit and to disable it. When the antitheft circuit is made standard equipment on a motor vehicle, it will be placed in a standard position within the operator's compartment. This will enable the would be thief to find the antitheft circuit and to disable it. Furthermore, these control switches must be activated every time the operator leaves the motor vehicle unattended.

U.S. Pat. No. 3,585,584, entitled Intruder Detector and Warning System, issued to Gene E. Behread on June 15, 1971, teaches a transistorized circuit adapted to be employed in a motor vehicle and set so that it will respond whenever a would be thief opens the hood or any door of the motor vehicle and will effect the activation of an alarm. When the would be thief opens the hood or any door of the motor vehicle, the transistorized circuit will disable the ignition circuit. The transistorized circuit provides a delay in the setting in order to accommodate the operator's exiting from the motor vehicle and then responds to any subsequent opening of the hood or any door of the motor vehicle whenever the ignition switch is in the off position. The transistorized circuit operates in conjunction with an alarm, which is generally a horn or a siren, an alarm relay which is electrically coupled to the alarm and which is triggered by the transistorized circuit, a 12 volt power source, the ignition switch of the motor vehicle which is electrically coupled to a set circuit of the transistorized circuit, and a combination of a hood switch and door switches electrically coupled to a detector control of the transistorized circuit to form an intruder detector and warning system.

The transistorized circuit includes a set circuit which is electrically coupled to the ignition switch and which turns the transistorized circuit on, a detector control which is electrically coupled to the hood switch and the door switches, a time delay circuit which is electrically coupled to the set circuit and to the detector control, a time on circuit which is electrically coupled to the detector control, a reset delay circuit which is electrically coupled to the time on circuit, and a multivibrator circuit which is electrically coupled to the reset delay circuit and which triggers the alarm relay thereby sounding the alarm. Each of these circuits contain many discrete components and the cost of these components and the cost of assembling these component is expensive. Furthermore, the transistorized circuit is relatively large and cumbersome so that it can not be easily hidden from plain view.

U.S. Pat. No. 3,643,214, entitled Solid-State Burglar Alarm System For Automobile, issued to Ronald E. Chan on Feb. 15, 1972, teaches a solid state burglar alarm system for operation with the courtesy light circuit of an automobile. The alarm system includes a main switch hidden within the operator's compartment of the automobile for energizing or de-energizing the alarm system and also includes an exit timer so that the operator can exit the automobile without triggering the alarm system. The alarm system consists of many discrete solid state components such as diodes, transistors, silicon controlled rectifiers (SCRs) and field effect transistors (FETs). These components are not only costly to buy, but also costly to assemble into the alarm system. Additionally it is a disadvantage of this alarm system that it must rely on a hidden switch to energize or de-energize itself.

U.S. Pat. No. 3,649,962, entitled Vehicle Alarm System, issued to Peter R. Bedard and Charles J. Spall, Jr. on Mar. 14, 1972 teaches a vehicle alarm system which includes a thermostatic delay relay which consists of a heater resistor and an armature which reacts to the heat from the heater resistor and closes after a particular period of delay thereby triggering an alarm. A set of tampering switches provide the current to the heater resistor whenever the motor vehicle is being tampered with by a would be thief. The problem with this alarm system is that the delay time can not be varied to suit the individual preferences of each operator of the motor vehicle.

SUMMARY OF THE INVENTION

In view of the foregoing factors and conditions characteristic of the prior art it is a primary object of the present invention to provide an alarm triggering circuit that is fully automatic and that may be implemented every time that the ignition system is turned off.

It is another object of the present invention to provide an alarm triggering circuit that may be disposed in plain view so that it may be placed in a standard position and still be protection against a would be thief.

It is still another object of the present invention to provide an improved alarm triggering circuit that readily interconnects with existing components of a motor vehicle.

It is yet another object of the present invention to provide an alarm triggering circuit which provides a variable delay time setting so that the delay time can be varied to suit the individual preferences of each operator of the motor vehicle.

It is yet still another object of the present invention to provide an alarm triggering circuit which does not require conscious effort on the part of the operator to set it, but which instead automatically sets and unset every time the ignition switch is turned off and on, respectively.

It is still yet another object of the present invention to provide an alarm triggering circuit that is not only reliable, but also easy to install into the motor vehicle.

In accordance with an embodiment of the present invention an alarm triggering circuit for use in an alarm system for a motor vehicle having an alarm such as a horn or a siren, an alarm relay electrically coupled to the alarm, an ignition system that provides positive voltage when it is turned on and a ground when it is turned off, and a power source has been described. The alarm triggering circuit includes an alarm activating circuit which provides a ground to the alarm relay, a setting circuit which sets the triggering circuit when the ignition is turned off, and a delaying circuit which enables an operator of the motor vehicle to exit it. The setting circuit includes a first timer chip whose output is normally a positive voltage and a first transistor which grounds the input of the first timer chip when the ignition system is turned on. When the ignition system is turned off, the first transistor no longer grounds the input of the first timer chip and the output of the first timer chip goes to ground. The delaying circuit includes a capacitor in series with a variable resistor and is electrically coupled to the alarm activating circuit which includes a second timer chip whose ground terminal is electrically coupled to the output terminal of the first timer chip and a second transistor whose base is electrically coupled to the output terminal of the second timer chip, whose collector is electrically coupled to ground, and whose emitter is electrically coupled to the alarm relay.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the FIGURE.

DESCRIPTION OF THE DRAWING

FIG. 1 is a circuit diagram of an alarm triggering circuit which is constructed in accordance with the principles of the present invention.

DESCRIPTION OF THE PREFERRED EMBODIMENT

The present invention is an alarm triggering circuit 10 for use in an alarm system for a motor vehicle and it can best be understood by referring to FIG. 1, which is a circuit diagram of the alarm triggering circuit 10. The circuit diagram shows that the alarm triggering circuit 10 includes an alarm activating circuit 11, a setting circuit 12 and a timing circuit 13. The alarm triggering circuit 11 includes a first timer chip 14, commercially known as a 555 timer, which has a ground terminal 15, a trigger terminal 16, a reset terminal 17, a discharge terminal 18 and an output terminal 19 and a first transistor 20, which is a transistor of pnp type, which has a base 21 electrically to the output terminal 19 of the first timer chip 14 through a diode 22, an emitter 23 and a collector 24. When the alarm triggering circuit 10 is installed in the motor vehicle, which has a positive power supply 25 and an alarm such as a horn or a siren, the first transistor 20 may be connected in two different ways. The first way is to connect the collector 24 to ground and the emitter 23 to an alarm relay which will activate the alarm. The second way is to connect the emitter 23 to the positive power source 25 and the collector 24 to the alarm which will be activated when a ground is applied to the base 21.

The timing circuit 13 includes a first capacitor 26 of a first particular capacitance which is electrically coupled to the ground terminal 14 of the first timer chip 14, a variable resistor 27, a first resistor 28 of a first particular resistance, a second diode 29, all of which are electrically coupled in series to both the first capacitor 26 and the trigger terminal 16 of the first timer chip 14. The timing circuit 13 also includes a second capacitor 31 of a second particular capacitance and a second resistor 32 of a second particular resistance, both of which are electrically coupled in parallel, a third resistor 33 of a third particular resistance, and a third diode 34, all of which are electrically coupled in series to the ground terminal 15 of the first timer chip 14 and the discharge terminal 18 of the first timer chip 14. The timing circuit 13 further includes a fourth resistor 35 of a fourth particular resistance which is electrically coupled to the discharge terminal 18 of the first timer chip 14 and to the first capacitor 26.

The timing circuit 13 receive its signal to activate the alarm from a set of tampering switches in the hood and all of the doors of the motor vehicle. Generally, the hood and the doors have tampering switches which produce a ground signal when they are activated. A no-delay interface circuit includes a second transistor 36 which has a base 37, an emitter 38 and a collector 39 and a fifth resistor 40 of a fifth particular resistance which is electrically coupled to the base 37 and the emitter 38 of the second transistor 36 which is a transistor of pnp type. The emitter 38 of the second transistor 36 is electrically coupled to the output terminal 19 of the first timer chip 14 and the base 37 of the second transistor 36 is electrically coupled to the set of tampering switches in the hood of the motor vehicle through a sixth resistor 41 of a sixth particular resistance. The collector 39 of the second transistor 36 is electrically coupled to the first resistor 28 and the variable resistor 27. A delay interface circuit includes a third transistor 42 which is a transistor of pnp type and which has a base 43, an emitter 44 and a collector 45. The base 43 of the third transistor 42 is electrically coupled to the set of tampering switches in the doors of the motor vehicle through a seventh resistor 46 of a seventh particular resistance. The emitter 44 of the third transistor 42 is electrically coupled to the output terminal 19 of the first timer chip 14 and the collector 45 of the third transistor 42 is electrically coupled to the variable resistor 27 and the first capacitor 26. In motor vehicles where the set of tampering switches provides a positive signal there is an eighth resistor 47 of an eighth particular resistance coupled in series with a third diode 48 to the first capacitor 26 to provide a delay interface circuit.

The setting circuit 12 includes a second timer chip 49 which has a reset terminal 50, a trigger terminal 51 and an output terminal 52. The output terminal 52 of the second timer chip 49 is electrically coupled to the ground terminal 15 of the first timer chip 14 so that as long as the voltage at the output terminal 52 is positive the first timer chip 14 will not operate the alarm. The setting circuit 12 also includes a fourth transistor 53 which is a transistor of npn type and which has a base 54, an emitter 55 and a collector 56, the base 54 of which is electrically coupled to the ignition system through a ninth resistor 57 of a ninth particular resistance and the emitter 55 of which is electrically coupled to ground. The setting circuit 12 further includes a third capacitor 58 of a third particular capacitance and a tenth resistor 59 of a tenth particular resistance electrically coupled in parallel to the trigger terminal 51 of the second timer chip 49 and both of which are electrically coupled in series with a fourth diode 60 to the collector 56 of the fourth transistor 53. The setting circuit 12 still further includes a switch 61 in series with an eleventh resistor 62 of an eleventh particular resistance electrically coupled in series to the positive power source 25 and to the reset terminal 50 of the second timer chip 49 and to the trigger terminal 51 of the second timer chip 49. The collector 56 of the fourth transistor 53 is electrically coupled to a fifth diode 63 in series with a twelfth resistor of a twelfth particular resistance and the first capacitor 26.

The alarm triggering circuit 10 also includes a thirteenth resistor 29 of a thirteenth particular resistance electrically coupled between the positive power source 25 and the reset terminal 50 of the second timer chip 49 and a fourteenth resistor 64 of a fourteenth particular resistance electrically coupled to the base 43 and the emitter 44 of the third transistor 42.

In operation the alarm triggering circuit 10 is activated when the ignition system is turned off and a ground is sent to the base 54 of the fourth terminal which turns it off thereby allowing the third capacitor 58 to charge up to full voltage. The third capacitor 58, when it reaches two-thirds of its full charge, i.e. 8.2 volts, triggers the second timer chip 49 causing the output terminal 52 of the second timer chip 49 to go to ground. When the output terminal 52 of the second timer chip 49 goes to ground, the first timer chip 14 is activated so that when a ground is applied to either the base 43 of the third transistor 42 or the base 37 of the second transistor 36 the first transistor 20 will be turned on. When the first timer chip 14 is activated, its output terminal 19 goes to a positive voltage and holds off the third transistor 20 while charging up the first capacitor 26 and the second capacitor 31 through a path created either by the third transistor 43 or the second transistor 36. When the first timer chip 14 is triggered, its output terminal 19 goes to ground and turns on the first transistor 20 thereby activating the alarm and the discharge terminal 18 of the first timer chip 14 goes to ground and causes the trigger terminal 16 to have its voltage level began to decrease thereby changing the output state of the output terminal 19 of the first timer chip 14 to a positive voltage level and turning off the alarm. As long as the set of tampering switches are sending a ground signal to either the second transistor 36 or the third transistor 42, the alarm triggering circuit 10 will recycle itself by recharging both the first capacitor 26 and the second capacitor 31, after they have both been discharge through the third resistor 33 and the third diode into the discharge terminal 18 of the first timer chip 14.

In operation the timing circuit 13 operates to provide an operator of the motor vehicle to enter or exit the motor vehicle without setting off the alarm by charging the first capacitor 26 through the variable resistor 27. When the first capacitor 26 is fully charged, the set of tampering switches may be opened, but the alarm will still be activated.

In operation the setting circuit 12 operates to provide a ground signal to the ground terminal 15 of the first timer chip 14. When the ignition system is turned off, a ground signal is sent to the base 54 of the fourth transistor 53 thereby turning it off. As long as the fourth transistor 53 is turned on the trigger terminal 51 of the second timer chip 49 is held at ground. When the fourth transistor 53 is turned off the capacitor 58 charges up to full capacity and provides a positive voltage to the trigger terminal 51 of the second timer chip 49. If the switch 61 is open, then there is no positive voltage to charge the third capacitor 58 and to trigger the second timer chip 49.

From the foregoing it can be seen that an alarm triggering circuit has been described for use in a motor vehicle having a set of tampering switches. The alarm triggering circuit is fully automatic and provides an alarm system that can be readily interconnected to existing components in the motor vehicle. Furthermore the alarm system provides a variable delay time to suit the individual preferences of each operator of the motor vehicle. One of the primary advantages of the alarm triggering circuit is that it takes a certain amount of time for the first capacitor to discharge even after the switch has been opened so that it can not be turned off by a would be thief even if the alarm triggering circuit is in plain sight. Another advantage of the alarm triggering circuit is that it not only consistent in operation, but it is also reliable because the resistance of each resistor, the capacitance of each capacitor and the operating characteristics of each diode and each transistor is standardized for the alarm triggering circuit.

It should be noted that circuit diagram of the alarm triggering circuit does not have any resistance values or capacitance values and that the circuit diagram shows generally the circuitry of the invention.

Accordingly, it is intended that the foregoing disclosure and showing made in the drawing shall be considered only as an illustration of the principles of the invention.

What is claimed is:

1. In an alarm system for a motor vehicle which has a power source, an ignition system that provides a positive voltage when it is turned on and a ground when it is turned off, an alarm such as a horn or a siren, an alarm relay which is electrically coupled to the alarm, and a set of tampering switches which provide a ground when the motor vehicle is being entered into or tampered with by a would be thief, an alarm triggering circuit comprising:
   a. alarm triggering means for providing a ground to the alarm relay thereby activating the alarm;
   b. delaying means for providing a signal from the set of tampering switches to said alarm triggering means; and
   c. setting means for setting said alarm triggering means when the ignition system is turned off, said setting means including:
   1. a first timer chip having a trigger terminal, a reset terminal and an output terminal and being electrically coupled to the power source of the motor vehicle;
   2. a first resistor of a first particular resistance being electrically coupled to the ignition system;
   3. a first transistor having a base which is electrically coupled to said first resistor, an emitter which is electrically coupled directly to ground, and a collector;
   4. a first diode electrically coupled to said trigger terminal of said first timer chip and to said collector of said first transistor;
   5. a first capacitor of a first particular capacitance electrically coupled to ground and to said trigger terminal of said first timer chip;

6. a second resistor of a second particular resistance being electrically coupled to said trigger terminal of said first timer chip; and
7. a switch being electrically coupled to the power source of the motor vehicle and to said second resistor.

2. In an alarm system for a motor vehicle an alarm triggering circuit according to claim 1 wherein said delaying means comprises:
   a. a second transistor having a base, an emitter and a collector, said second transistor is of the type that is turned on by a ground signal to its said base and it has its collector electrically coupled to any tampering switch which provides a positive voltage signal and its base electrically coupled to the set of tampering switches providing a ground signal;
   b. a second capacitor of a second particular capacitance being electrically coupled to said collector of said second transistor and to said output terminal of said first timer chip; and
   c. a variable resistor electrically coupled to said collector of said second transistor and to said alarm triggering means.

3. In an alarm system for a motor vehicle an alarm triggering circuit according to claim 2 wherein said alarm triggering means comprises:
   a. a second timer chip having a trigger terminal, a reset terminal, a discharge terminal and an output terminal and being electrically coupled to the power source and to said output terminal of said first timer chip, said output terminal of said second timer chip is electrically coupled to said emitter of said second transistor;
   b. a third transistor having a base, an emitter and a collector and being of the type which is turned on by a ground signal, said emitter of said third transistor being electrically coupled to the alarm relay, said collector of said third transistor being electrically coupled to ground, and said base of said third transistor being electrically coupled through a diode to said output terminal of said second timer chip; and
   c. a third resistor of a third particular resistance electrically coupled to said discharge terminal of said second timer chip and to said collector of second transistor.

* * * * *